V. C. WAGNER.
WARMING PLATE.
APPLICATION FILED JAN. 3, 1917.
1,316,006.
Patented Sept. 16, 1919.
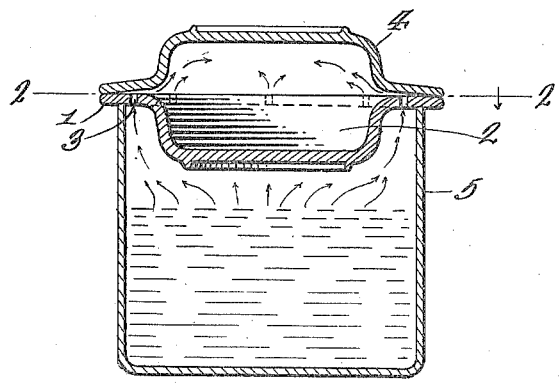
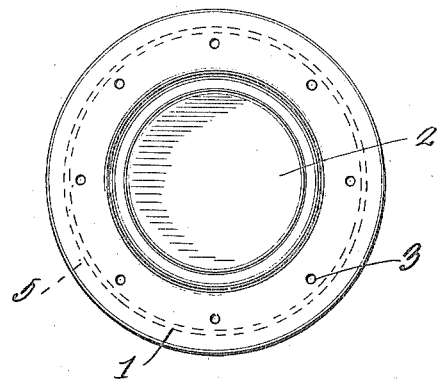
Inventor
Virgil C. Wagner
Witness
Guy M. Spring
Lloyd W. Patch

UNITED STATES PATENT OFFICE.

VIRGIL C. WAGNER, OF NEW YORK, N. Y.

WARMING-PLATE.

1,316,006.  Specification of Letters Patent.  Patented Sept. 16, 1919.

Application filed January 3, 1917. Serial No. 140,416.

*To all whom it may concern:*

Be it known that I, VIRGIL C. WAGNER, a citizen of the United States, residing at New York city, in the county of Bronx and State of New York, have invented certain new and useful Improvements in Warming-Plates, of which the following is a specification.

This invention relates to an improvement in warming plates, and more particularly to a device of this character intended to be used to warm or keep warm cooked food, and also adaptable for use in warming "left overs."

An object of my invention is to provide a plate constructed of china, porcelain, enamel ware, or other suitable material so constructed that it may be placed over a pot or vessel of boiling water and the steam rising from the pot or vessel will be applied to the plate and directly to the food being warmed, thus securing application of the heat in a manner to accomplish most efficient warming of the food and at the same time insuring that the food will not be dried or hardened by the warming over process.

A further object resides in constructing the warming plate to have substantially the form of a deep plate with openings formed through the rim portion thereof above the level which will be occupied by the food so that as a cover, as for instance another similarly shaped plate, is placed over the warming plate to rest against the outer marginal edge of the rim, the steam from the water used in warming the plate will rise through the openings and will thus be received and retained in the chamber as formed by the two plates to in this way be brought into direct contact with the food and thus warm the same in a much shorter space of time.

With the above and other objects in view, my invention consists in certain novel features of construction and combinations of parts which will be hereinafter set forth in connection with the drawings and then more particularly pointed out in the claim.

In the drawings:—

Figure 1 shows a vertical sectional view through the warming plate, a vessel over which the same is fitted, and a cover for the plate.

Fig. 2 is a plan view of the plate with the relative positioning of the rim wall of the vessel indicated by dotted lines.

The warming plate proper, which can be made of china, porcelain, enameled ware, or other suitable material has a rim portion 1 and a comparatively deeply dished central portion 2 for the reception of the food stuffs or material which is to be warmed. The plate partakes substantially of the same lines as embodied in the design of soup plates as used some several years ago, and in the rim or edge portion has a plurality of openings or perforations 3. As is better illustrated in Fig. 2, these perforations or openings 3 are preferably spaced in predetermined relation and it is of course to be understood that they are formed entirely through the rim or edge portions 1. If desired, a special cover as indicated at 4, in Fig. 1, can be employed, or the warming plate might be manufactured as a separate utensil to have a dish, pan, or other cover of standard form fitted thereover.

In the use of the warming plate, a vessel or pot 5 will be filled with water substantially to the level indicated in Fig. 1 and this water is heated to the vaporizing point and perhaps even to the boiling point so that the steam from the water will pass up through the openings 3 of the warming plate as fitted over the top of the pot or vessel to have its rim edge received upon the upper edge of the same. The rim portion 1 also slopes inwardly from the openings or perforations 3, so that the water from the condensed steam on the rim will drain into the dish, that is, the dished central portion 2. It will of course be understood that the pot or vessel must be of sufficient size that the perforations or openings 3 will be within the confines of the same, and that the cover 4 must also be of such size that it embraces these openings or perforations, and further it might be stated that it is preferable that the warming plate fit tightly against the upper edge of the pot or vessel and that the cover also fit rather snugly upon the rim of the warming plate.

From the foregoing it will be seen that I have provided a warming plate which can be manufactured and sold as a complete utensil to be fitted to a pot of ordinary form and to have a cover of usual form fitted thereon, or that the three parts might be constructed as a set to be used together, and if this latter course be pursued, it will be apparent that the cover 4 and the pot or vessel 5 can be put to other uses than the particular one in which they coöperate with the warming plate proper.

While I have shown and described only one particular form of the warming plate, have mentioned only certain materials from which the same might be constructed, and have illustrated and described only one adaptation of the same in use, it will be understood that changes and variations might be made without departing from the spirit and scope of my invention, and hence I do not wish to be limited to the exact disclosure but only to such points as may be set forth in the claim.

I claim:

A two part warming device including a dish having a concaved central portion and a relatively broad radial rim provided with a plurality of circumferentially spaced openings, and a cover in the form of a dish having a central concaved portion and a conical rim corresponding in diameter to the diameter of the first dish rim, the cover being inverted over the first dish with the rims in contact only at the extreme periphery thereof to provide a steam space therebetween.

In testimony whereof I affix my signature in presence of two witnesses.

VIRGIL C. WAGNER.

Witnesses:
DAVID H. WEST,
JOHN J. PAULSEN.